(12) United States Patent
Witt

(10) Patent No.: US 6,347,369 B1
(45) Date of Patent: Feb. 12, 2002

(54) METHOD AND CIRCUIT FOR SINGLE CYCLE MULTIPLE BRANCH HISTORY TABLE ACCESS

(75) Inventor: David B. Witt, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/159,900

(22) Filed: Sep. 24, 1998

Related U.S. Application Data

(60) Provisional application No. 60/065,878, filed on Nov. 17, 1997.

(51) Int. Cl.$^7$ ................................................. G06F 9/40
(52) U.S. Cl. ....................................................... 712/240
(58) Field of Search ................................ 712/206, 207, 712/215, 233–240

(56) References Cited

U.S. PATENT DOCUMENTS

| | | | |
|---|---|---|---|
| 5,608,886 A | 3/1997 | Blomgren et al. ........... | 395/586 |
| 5,742,805 A | 4/1998 | Kulkarni et al. ............. | 395/586 |
| 5,758,143 A | 5/1998 | Levitan ........................ | 395/587 |
| 5,805,878 A | 9/1998 | Rahman et al. .............. | 395/586 |
| 5,903,750 A | 5/1999 | Yeh et al. .................... | 395/583 |
| 5,918,044 A | 6/1999 | Levitan et al. ............... | 395/582 |

OTHER PUBLICATIONS

Yeh, et al., "Increasing the Instruction Fetch Rate via Multiple Branch Prediction and a Branch Address Cache," The 7$^{th}$ACM International Conference on Supercomputing, pp. 67–76, Jul. 10–23, 1993, Tokyo, Japan.

Wallace and Bagherzadeh, "Multiple Branch and Block Prediction, "IEEE, Dept. of Eng., California Univ., Irvine, CA, pp. 94–103, Feb. 1997.

Dutta and Franklin, "Block–Level Prediction for Wide–Issue Superscalar Processor, "IEEE, Dept. of Electr. & Comput Eng., University of SC, pp. 143–152, Apr. 1995.

*Primary Examiner*—John A. Follansbee
(74) *Attorney, Agent, or Firm*—Conley, Rose & Tayon, PC; Lawrence J. Merkel

(57) ABSTRACT

Disclosed is a circuit and method for multiple access of a branch history table during a single clock cycle. In accordance thereto, a first branch history table index is generated which is used for accessing the branch history table. A first counter value is read from the branch history table in response to accessing the branch history table using the first branch history table index. A second branch history table index is also generated for accessing the branch history table. A pair of counter values are read from the branch history table in response to accessing the branch history table using the second branch history table index. One of the pair of counter values is selected based upon the value of the first counter value read from the branch history table. The first and second counter values in turn are used for predicting corresponding first and second branch instructions. The first and second branch history table indexes are generated in the same cycle. Likewise, the first counter value and the pair of counter values are read from the branch history table in the same clock cycle. Lastly, the second counter value is selected from the pair of counter values in the same cycle.

48 Claims, 5 Drawing Sheets

METHOD AND CIRCUIT FOR SINGLE CYCLE MULTIPLE BRANCH HISTORY TABLE ACCESS

This application claims priority to provisional application 60/065,878 filed Nov. 17, 1997.

BACKGROUND OF THE INVENTION

1. Field of the Invention

The present invention is related to the field of processors and, more particularly, to multiple branch history table access during a single clock.

2. Description of the Related Art

Superscalar processors attempt to achieve high performance by dispatching and executing multiple instructions per clock cycle, and by operating at the shortest possible clock cycle time consistent with the design. As used herein, the term clock cycle means a period of time allocated to a superscalar processing stage for accomplishing the function assigned to that stage. To the extent that a given processor is successful at dispatching and/or executing multiple instructions per clock cycle, high performance may be realized. In order to increase the average number of instructions dispatched per clock cycle, processor designers have been designing superscalar processors which employ wider issue rates. A "wide issue" superscalar processor is capable of dispatching (or issuing) a larger maximum number of instructions per clock cycle than a "narrow issue" superscalar processor is capable of dispatching. During clock cycles in which a number of dispatchable instructions is greater than the narrow issue processor can handle, the wide issue processor may dispatch more instructions, thereby achieving a greater average number of instructions dispatched per clock cycle.

In order to support wide issue rates, it is desirable for the superscalar processor to be capable of fetching a large number of instructions per clock cycle (on the average). For brevity, a processor capable of fetching a large number of instructions per clock cycle (on the average) will be referred to herein as having a "high fetch bandwidth". If the superscalar processor is unable to achieve a high fetch bandwidth, then the processor may be unable to take advantage of the wide issue hardware due to a lack of instructions being available for issue.

Several factors may impact the ability of a particular processor to achieve a high fetch bandwidth. For example, many code sequences have a high frequency of branch instructions, which may redirect the fetching of subsequent instructions within that code sequence to a branch target address specified by the branch instruction. Accordingly, the processor may identify the branch target address after fetching the branch instruction. Subsequently, the next instructions within the code sequence may be fetched using the branch target address. Processors attempt to minimize the impact of branch instructions on the fetch bandwidth by employing highly accurate branch prediction mechanisms and by generating the subsequent fetch address (either branch target or sequential) as rapidly as possible. They are several different branch prediction mechanisms currently in use within microprocessors. One branch prediction mechanism employs a branch history storage device for storing a multi-bit branch history value, each bit of which identifies the resolution of a previously predicted branch instruction. This multi-bit branch history value is used, alone or in combination with the instruction address of the branch instruction to be predicted, to index bimodal counters in a branch history table. The bimodal counters have four states, and branch instructions are predicted "taken" or "not taken" depending on the value of the bimodal counter read from the history table.

As used herein, a branch instruction is an instruction which specifies the address of the next instructions to be fetched. The address may be the sequential address identifying the instruction immediately subsequent to the branch instruction within memory, or a branch target address identifying a different instruction stored elsewhere in memory. Unconditional branch instructions always select the branch target address, while conditional branch instructions select either the sequential address or the branch target address based upon a condition specified by the branch instruction. For example, the processor may include a set of condition codes which indicate the results of executing previous instructions, and the branch instruction may test one or more of the condition codes to determine if the branch selects the sequential address or the target address. A branch instruction is referred to as taken if the branch target address is selected via execution of the branch instruction, and not taken if the sequential address is selected. Similarly, if a conditional branch instruction is predicted via a branch prediction mechanism, the branch instruction is referred to as predicted taken if the branch target address is predicted to be selected upon execution of the branch instruction and is referred to as predicted not taken if the sequential address is predicted to be selected upon execution of the branch instruction.

Typically, a plurality of instructions are fetched by the superscalar processor, the plurality containing at least two conditional branch instructions. In order to take advantage of wide issue superscalar architecture, it is sometimes necessary to predict both fetched branch instructions in the same clock cycle. However, prior art branch prediction mechanisms are configured for only one branch prediction per clock cycle. In these prior art processors, two clock cycles may be needed particularly when the first instruction is predicted as not taken or taken to a target address just prior to the second branch instruction. The need for two clock cycles to predict the pair of branch instructions may have adverse impact on processor performance. It would be desirable to sustain two branch predictions per clock cycle, especially since many of the pairs of conditional branch instructions fetched per clock cycle are predicted not taken or taken with a target address just prior to the second conditional branch instruction.

SUMMARY OF THE INVENTION

The problems outlined above in large part are solved by the present invention which allows at least two branch instructions to be predicted in a single clock cycle. The present invention sustains the at least two branch instruction predictions by providing a circuit and method for multiple branch history table access in a single clock cycle. In accordance with the present invention, a circuit and method is provided for generating a first branch history table index which is used to access a branch history table. A first counter value is read from the branch history table in response to accessing the branch history table using the first branch history table index. Additionally, a second branch history table index is generated which is used for accessing the branch history table. In response to accessing the branch history table using the second branch history table index, a pair of counter values are read therefrom. One of the pair of counter values is selected as the second counter, the selection being based upon the value of the first counter value. The first counter value is used to predict a first branch instruction while the counter value is used to protect a second branch instruction.

The first and second branch history table indexes are generated within one clock cycle. Moreover, the first and second values are provided in the one clock cycle. This allows the first and second branch instructions to be predicted in the one clock cycle.

In accordance with another embodiment of the present invention, the first branch history table index is generated as a function of a first branch history value stored in a branch history storage device. The second branch history table index is generated as a function of a second branch history value where the second branch history value is formed from the (M-1) least significant bits of the first branch history value. The second branch history table index can be generated without updating the branch history storage device with the first branch prediction.

One advantage of the present invention is that the first and second counter values can be obtained from the branch history table in a single clock cycle.

Another advantage of the present invention is that it enables the prediction of two branch instructions within one clock cycle.

Yet another advantage of the present invention is that it enables prediction of multiple branch instructions contained within a single instruction run provided by an I-cache.

BRIEF DESCRIPTION OF THE DRAWINGS

Other objects and advantages of the invention will become apparent upon reading the following detailed description and upon reference to the accompanying drawings in which.

Figure 1:
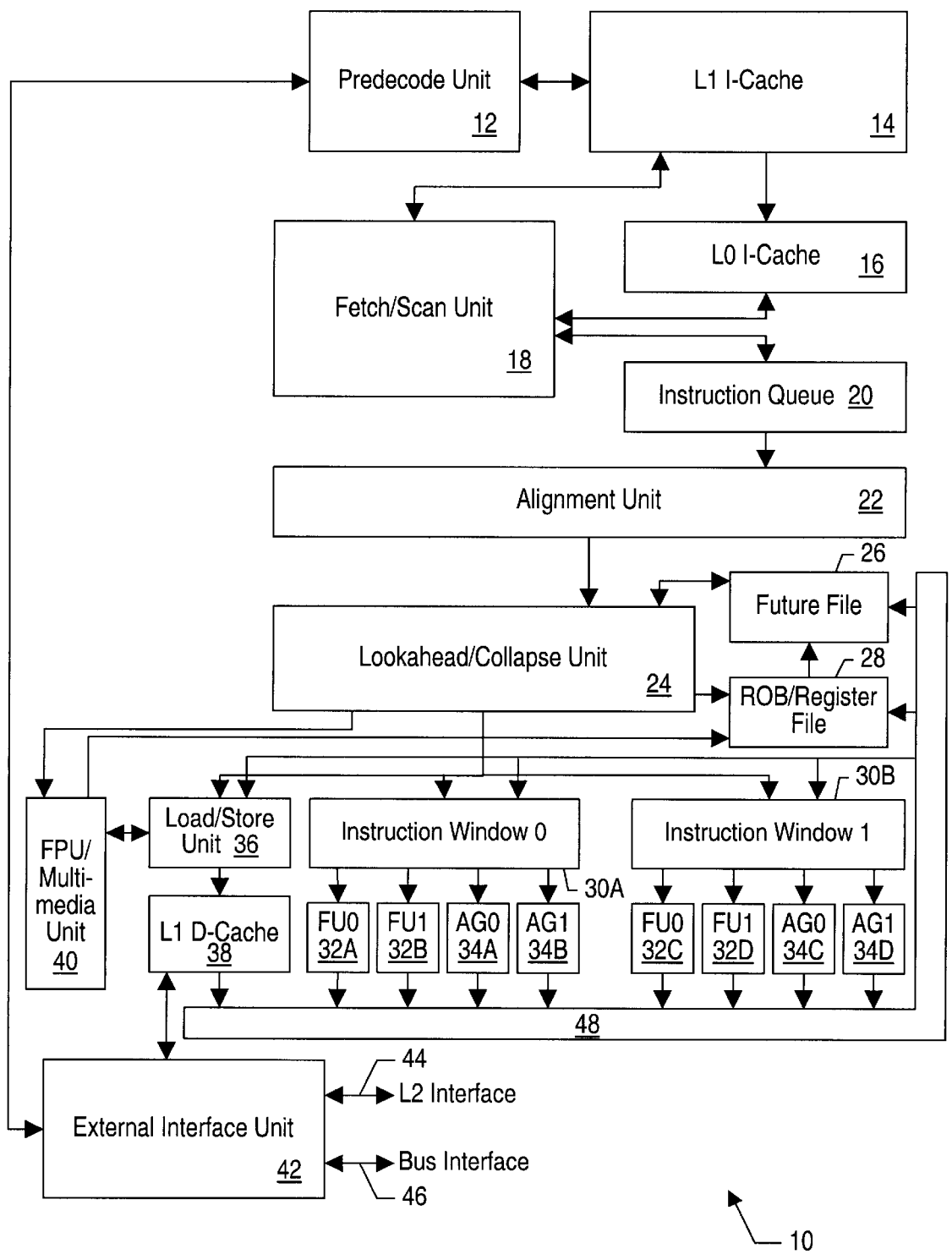
FIG. 1 is a block diagram of one embodiment of a processor employing the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a superscalar processor 10 employing the present invention is shown. Other embodiments employing the present invention are possible and contemplated. In the embodiment shown in FIG. 1, processor 10 includes a predecode unit 12, an L1 I-cache 14, an L0 I-cache 16, a fetch/scan unit 18, an instruction queue 20, an alignment unit 22, a look ahead/collapse unit 24, a future file 26, a reorder buffer/register file 28, a first instruction window 30A, a second instruction window 30B, a plurality of functional units 32A, 32B, 32C, and 32D, a plurality of address generation units 34A, 34B, 34C, and 34D, a load/store unit 36, an L1 D-cache 38, an FPU/multimedia unit 40, and an external interface unit 42. Elements referred to herein by a particular reference number followed by various letters will be collectively referred to using the reference number alone. For example, functional units 32A, 32B, 32C, and 32D will be collectively referred to as functional units 32.

In FIG. 1, external interface unit 42 is coupled to predecode unit 12, L1 D-cache 38, an L2 interface 44, and a bus interface 46. Predecode unit 12 is further coupled to L1 I-cache 14. L1 I-cache 14 is coupled to L0 I-cache 16 and to fetch/scan unit 18. Fetch/scan unit 18 is also coupled to L0 I-cache 16 and to instruction queue 20. Instruction queue 20 is coupled to alignment unit 22, which is further coupled to look ahead/collapse unit 24. Look ahead/collapse unit 24 is further coupled to future file 26, reorder buffer/register file 28, load/store unit 36, first instruction window 30A, second instruction window 30B, and FPU/multimedia unit 40. FPU/multimedia unit 40 is coupled to load/store unit 36 and to reorder buffer/register file 28. Load/store unit 36 is coupled to L1 D-cache 38. First instruction window 30A is coupled to functional units 32A–32B and to address generation units 34A–34B. Similarly, second instruction window 30B is coupled to functional units 32C–32D and address generation units 34C–34D. Each of L1 D-cache 38, functional units 32, and address generation units 34 are coupled to a plurality of result buses 48 which are further coupled to load/store unit 36, first instruction window 30A, second instruction window 30B, reorder buffer/register file 28, and future file 26.

Generally speaking, processor 10 is configured to fetch instructions from L0 I-cache 16. Fetch/scan unit 18 is configured to scan the fetched instructions in order to detect the branch instructions included therein, and is further configured to predict the detected branch instructions. If a branch instruction is predicted taken and has a forward branch target address, fetch/scan unit 18 is configured to selectively cancel one or more of the fetched instructions subsequent to the predicted branch instruction while retaining other fetched instructions subsequent to the predicted branch instruction. More particularly, if the forward branch target address is within a predetermined range of the branch fetch address (i.e., the instruction address of the corresponding branch instruction), the instructions between the predicted branch instruction and a subsequent instruction (i.e., the instruction corresponding to the branch target address) within the plurality of fetched instructions, are cancelled, while the subsequent instruction and any instructions succeeding the subsequent instruction within the plurality of instructions are retained. Thus, one or more of the instructions at the target address have already been fetched concurrent with the branch instruction and are retained within the pipeline of processor 10.

Advantageously, the achievable fetch bandwidth may be improved by retaining target instructions which are fetched concurrently with the branch instruction having a forward branch target address. Instead of discarding the target instructions which have already been fetched and fetching those same target instructions during a subsequent fetch using the forward branch target address, the target instructions are retained and instructions sequential to the previously fetched target instructions are fetched.

In one embodiment, fetch/scan unit 18 is configured to detect and predict up to two two branch instructions within a run of instructions fetched from L0 I-cache 16 during a single clock cycle. If the first detected branch instruction is predicted taken and has a forward branch target address, instructions may be selectively cancelled as described above. In such a case, fetch/scan unit 18 then determines if the second detected branch instruction is still within the run of instructions (i.e. the second branch instruction was not cancelled). If the second detected branch instruction was not cancelled, is predicted taken, and has a forward branch target address, instructions subsequent to the second detected branch instruction may be selectively cancelled and retained in a manner similar to the processing of the first detected branch instruction. Advantageously, up to two branch instructions may be predicted per fetch, and fetch bandwidth may be even further increased.

As used herein, the term "forward branch target address" refers to a branch target address which is numerically greater than the fetch address of the branch instruction specifying the branch target address. The fetch address of the branch instruction (or "branch fetch address") is the address at which the branch instruction is stored.

Furthermore, the term canceling instructions refers to invalidating the instructions within the pipeline subsequent to fetching the instructions. For example, the instructions may be invalidated within instruction queue 20. The term "squashing instructions" may also be used herein to refer to canceling the instructions. An instruction is referred to as being between a branch instruction and a subsequent target instruction if the instruction is stored at a fetch address which is numerically greater than the branch fetch address and numerically less then the branch target address specified by the branch instruction stored at the branch fetch address. Additionally, a forward target address is "within a predetermined range" of the corresponding branch fetch address if the difference between the branch fetch address and the branch target address is less than or equal to a predetermined value (e.g. 64 bytes, in one embodiment).

Predecode unit 12 receives instruction bytes fetched by external interface unit 42 and predecodes the instruction bytes prior to their storage within L1 I-cache 14. Predecode information generated by predecode unit 12 is stored in L1 I-cache 14 as well. Generally, predecode information is provided to aid in the identification of instruction features which may be useful during the fetch and issue of instructions but which may be difficult to generate rapidly during the fetch and issue operation. The term "predecode", as used herein, refers to decoding instructions to generate predecode information which is later stored along with the instruction bytes being decoded in an instruction cache (e.g. L1 I-cache 14 and/or L0 I-cache 16).

In one embodiment, processor 10 employs two bits of predecode information per instruction byte. One of the bits, referred to as the "start bit", indicates whether or not the instruction byte is the initial byte of an instruction. When a group of instruction bytes is fetched, the corresponding set of start bits identifies the boundaries between instructions within the group of instruction bytes. Accordingly, multiple instructions may be concurrently selected from the group of instruction bytes by scanning the corresponding start bits. While start bits are used to locate instruction boundaries by identifying the initial byte of each instruction, end bits could alternatively be used to locate instruction boundaries by identifying the final byte of each instruction.

The second predecode bit used in this embodiment, referred to as the "control transfer" bit, identifies which instructions are branch instructions. The control transfer bit corresponding to the initial byte of an instruction indicates whether or not the instruction is a branch instruction. The control transfer bit corresponding to subsequent bytes of the instruction is a don't care except for relative branch instructions having a small displacement field. According to one particular embodiment, the small displacement field is an 8 bit field. Generally, a "small displacement field" refers to a displacement field having fewer bits than the target address generated by branch instructions. For relative branch instructions having small displacement fields, the control transfer bit corresponding to the displacement byte is used as described below.

In addition to generating predecode information corresponding to the instruction bytes, predecode unit 12 is configured to recode the displacement field of relative branch instructions to actually store the target address in the present embodiment. In other words, predecode unit 12 adds the displacement of the relative branch instruction to the address corresponding to the relative branch instruction as defined by the instruction set employed by processor 10. The resulting target address is encoded into the displacement field as a replacement for the displacement, and the updated displacement field is stored into L1 I-cache 14 instead of the original displacement field. Target address generation is simplified by precomputing relative target addresses, and hence the branch prediction mechanism may operate more efficiently.

In one embodiment of processor 10 which employs the x86 instruction set, predecode unit 12 is configured to recode eight bit and 32 bit displacement fields. The 32 bit displacement fields may store the entirety of the target address. On the other hand, the eight bit displacement field is encoded. More particularly, the eight bit displacement field and corresponding control transfer predecode bit is divided into a cache line offset portion and a relative cache line portion. The cache line offset portion is the cache line offset portion of the target address. The relative cache line portion defines the cache line identified by the target address (the "target cache line") in terms of a number of cache lines above or below the cache line storing the relative branch instruction. A first cache line is above a second cache line if each byte within the first cache line is stored at an address which is numerically greater than the addresses at which the bytes within the second cache line are stored. Conversely, a first cache line is below the second cache line if each byte within the first cache line is stored at an address which is numerically less than the addresses at which the bytes within a second cache line are stored. A signed eight bit displacement specifies an address which is +/−128 bytes of the address corresponding to the branch instruction. Accordingly, the number of above and below cache lines which can be reached by a relative branch instruction having an eight bit displacement is limited. The relative cache line portion encodes this limited set of above and below cache lines. Generally, branch instructions having a small displacement field have displacements within a predefined range, whereas larger displacement fields may store values outside the predefined range.

Tables 1 and 2 below illustrates an exemplary encoding of the predecode information corresponding to a byte in accordance with one embodiment of processor 10.

TABLE 1

Predecode Encoding

| Start Bit | Control Transfer Bit | Meaning |
| --- | --- | --- |
| 1 | 0 | Start byte of an instruction which is not a branch. |
| 1 | 1 | Start byte of a branch instruction. |
| 0 | x | Not an instruction boundary. Control Transfer Bit corresponding to displacement is used on 8-bit relative branches to encode target address as shown in Table 2 below. |

TABLE 2

Target Address Encoding

| Control Transfer Bit | Displacement Byte Most Significant Bits (binary) | Meaning |
| --- | --- | --- |
| 0 | 00 | Within Current Cache Line |
| 0 | 01 | One Cache Line Above |
| 0 | 10 | Two Cache Line Above |
| 1 | 01 | One Cache Line Below |
| 1 | 10 | Two Cache Lines Below |

Note: Remaining displacement byte bits are the offset within the target cache line. Control Transfer Bit is effectively a direction, and the most significant bits of the lines.

Predecode unit 12 conveys received instruction bytes and corresponding precode information to L1 I-cache 14 for storage. L1 I-cache 14 is a high speed cache memory for storing instruction bytes and predecode information. L1 I-cache 14 may employ any suitable configuration, including directing direct mapped and set associative configurations. In one particular embodiment, L1 I-cache 14 is a 128 KB, two way set associative cache employing 64 byte cache lines. L1 I-cache 14 includes additional storage for the predecode information corresponding to the instruction bytes stored therein. The additional storage is organized similar to the instruction bytes storage. As used herein, the term "cache line "refers to the unit of allocation of storage in a particular cache. Gernerally, the bytes within a cache line are manipulated (i.e. allocated and deallocated) by the cache as a unit.

In one embodiment, L1 I-cache 14 is linearly addressed and physically tagged. A cache is linearly addressed if at least one of the address bits used to index the cache is a linear address bit which is subsequently translated to a physical address bit. The tags of a linearly address/physically tagged cache include each translated bit in addition to the bits not used to index. As specified by the x86 architecture, instructions are defined to generate logical addresses which are translated through a segmentation translation mechanism to a linear address which in turn is further translated through a page translation mechanism to a physical address. It is becoming increasingly common to employ flat addressing mode, in which the logical address and corresponding linear address are equal. Processor 10 may be configured to assume flat addressing mode. Accordingly, fetch addresses, target addresses, etc. as generated by executing instructions are linear addresses. In order to determine if a hit is detected in L1 I-cache 14, the linear address presented thereto by fetch/scan unit 18 is translated using a translation lookaside buffer (TLB) to a corresponding physical address which is compared to the physical tags from the indexed cache lines to determine a hit/miss. When flat addressing mode is not used, processor 10 may still execute code but additional clock cycles may be used to generate linear addresses from logical addresses.

L0 I-cache 16 is also a high speed cache memory for storing instruction bytes. Because L1 I-cache 14 is large, the access time of L1 I-cache 14 may be large. In one particular embodiment, L1 I-cache 14 uses a two clock cycle access time. In order to allow for single cycle fetch access, L0 I-cache 16 is employed. L0 I-cache 16 is comparably smaller than L1 I-cache 14, and hence may support a more rapid access time. In one particular embodiment, L0 I-cache 16 is a 512 byte fully associative cache. Similar to L1 I-cache 14, L0 I-cache 16 is configured to store cache lines of instruction bytes and corresponding predecode information (e.g. 512 bytes stores eight 64 byte cache lines and corresponding predecode data is stored in additional storage). In one embodiment, L0 I-cache 16 may be linearly addressed and linearly tagged.

Fetch/scan unit 18 is configured to generate fetch addresses for L0 I-cache 16 and fetch or prefetch addresses for L1 I-cache 14. Instructions fetched from L0 I-cache 16 are scanned by fetch/scan unit 18 to identify instructions for dispatch as well as to locate branch instructions and to form branch predictions corresponding to the located branch instructions. Instruction scan information and corresponding instruction bytes are stored into instruction queue 20 by fetch/scan unit 18. Additionally, the identified branch instructions and branch predictions are used to generate subsequent fetch addresses for L0 I-cache 16.

Fetch/scan unit 18 employs a prefetch algorithm to attempt to prefetch cache lines from L1 I-cache 14 to L0 I-cache 16 prior to the prefetched cache lines being fetched by fetch/scan unit 18 for dispatch into processor 10. Any suitable prefetch algorithm may be used. One embodiment of the prefetch algorithm is set forth in more detail below.

Fetch/scan unit 18 employs an aggressive branch prediction mechanism in attempt to fetch larger "runs" of instructions during a clock cycle. As used herein, a "run" of instructions is a set of one or more instructions predicted to be executed in the sequence specified within the set. For example, fetch/scan unit 18 may fetch runs of 24 instruction bytes from L0 I-cache 16. Each run is divided into several sections which fetch/scan unit 18 scans in parallel to identify branch instructions and to generate instruction scan information for instruction queue 20. According to one embodiment, fetch/scan unit 18 attempts to predict up to two branch instructions per clock cycle, as will be more fully described below, in order support large instruction runs.

Instruction queue 20 is configured to store instruction bytes provided by fetch/scan unit 18 for subsequent dispatch. Instruction queue 20 may operate as a first-in, first-out (FIFO) buffer. In one embodiment, instruction queue 20 is configured to store multiple entries, each entry comprising: a run of instructions, scan data identifying up to five instructions within each section of the run, and addresses corresponding to each section of the run. Additionally, instruction queue 20 may be configured to select up to six instructions within up to four consecutive run sections for presentation to alignment unit 22. Instruction queue 20 may, for example, employ 2–3 entries.

Alignment unit 22 is configured to route instructions identified by instruction queue 20 to a set of issue positions within look ahead/collapse unit 24. In other words, alignment unit 22 selects the bytes which form each instruction from the run sections provided by instruction queue 20 responsive to the scan information provided by instruction queue 20. The instructions are provided into the issue positions in program order (i.e. the instruction which is first in program order is provided to the first issue position, the second instruction in program order is provided to the second issue position, etc.).

Look ahead/collapse unit 24 decodes the instructions provided by alignment unit 22. FPU/multimedia instructions detected by look ahead/collapse unit 24 are routed to FPU/multimedia unit 40. Other instructions are routed to first instruction window 30A, second instruction window 30B, and/or load/store unit 36. In one embodiment, a particular instruction is routed to one of first instruction window 30A or second instruction window 30B based upon the issue position to which the instruction was aligned by alignment unit 22. According to one particular embodiment, instructions from alternate issue positions are routed to alternate instruction windows 30A and 30B. For example, instructions from issue positions zero, two, and four may be routed to the first instruction window 30A and instructions from issue positions one, three, and five may be routed to the second instruction window 30B. Instructions which include a memory operation are also routed to load/store unit 36 for access to L1 D-cache 38.

Additionally, look ahead/collapse unit 24 attempts to generate look ahead addresses or execution results for certain types of instructions. Look ahead address/result generation may be particularly beneficial for embodiments employing the x86 instruction set. Because of the nature the x86 instruction set, many of the instructions in a typical code sequence are versions of simple moves. One reason for this feature is that x86 instructions include two operands, both of which are source operands and one of which is a destination operand. Therefore, one of the source operands of each instruction is overwritten with an execution result. Furthermore, the x86 instruction set specifies very few registers for storing register operands. Accordingly, many instructions are moves of operands to and from a stack maintained within memory. Still further, many instruction dependencies are dependencies upon the ESP/EBP registers and yet many of the updates to these registers are increments and decrements of the previously stored values.

To accelerate the execution of these instructions, look ahead/collapse unit 24 generates lookahead copies of the ESP and EBP registers for each of instructions decoded during a clock cycle. Additionally, lookahead/collapse unit 24 accesses future file 26 for register operands selected by each instruction. For each register operand, future file 26 may be storing either an execution result or a tag identifying a reorder buffer result queue entry corresponding to the most recent instruction having that register as a destination operand.

In one embodiment, lookahead/collapse unit 24 attempts to perform an address calculation for each instruction which includes: (i) a memory operand; and (ii) register operands used to form the address of the memory operand available from future file 26 or lookahead copies of ESP/EBP. Additionally, lookahead/collapse unit 24 attempts to perform a result calculation for each instruction which: (i) does not include a memory operand; (ii) specifies an add/subtract operation (including increment and decrement); and (iii) includes register operands available from future file 26 or lookahead copies of ESP/EBP. In this manner, many simple operations may be completed prior to instructions being sent to instruction windows 30A–30B.

Lookahead/collapse unit 24 detects dependencies between a group of instructions being dispatched and collapses any execution results generated therein into instructions dependent upon those instruction results. Additionally, lookahead/collapse unit 24 updates future file 26 with the lookahead execution results. Instruction operations which are completed by lookahead/collapse unit 24 (i.e. address generations and/or instruction results are generated and load/store unit 36 or future file 26 and the result queue are updated) are not dispatched to instruction windows 30A–30B.

Lookahead/collapse unit 24 allocates a result queue entry in reorder buffer/register file 28 for each instruction dispatched. In one particular embodiment, reorder buffer/register file 28 includes a result queue organized in a line-oriented fashion in which storage locations for execution results are allocated and deallocated in lines having enough storage for execution results corresponding to a maximum number of concurrently dispatchable instructions. If less than the maximum number of instructions are dispatched, then certain storage locations within the line are empty. Subsequently dispatched instructions use the next available line, leaving the certain storage locations empty. In one embodiment, the result queue includes 40 lines, each of which may store up to six execution results corresponding to concurrently dispatched instructions. Execution results are retired from the result queue into the register file included within reorder buffer/register file 28. Additionally, the reorder buffer handles branch mispredictions, transmitting the corrected fetch address generated by the execution of the branch instruction to fetch/scan unit 18. Similarly, instructions which generate other exceptions are handled within the reorder buffer. Results corresponding to instructions subsequent to the exception-generating instruction are discarded by the reorder buffer. The register file comprises a storage location for each architected register. For example, the x86 instruction set defines 8 architected registers. The register file for such an embodiment includes eight storage locations. The register file may further include storage locations used as temporary registers by a microcode unit in embodiments employing microcode units.

Future file 26 maintains the speculative state of each architected register as instructions are dispatched by lookahead/collapse unit 24. As an instruction having a register destination operand is decoded by lookahead/collapse unit 24, and the tag identifying the storage location within the result queue portion of reorder buffer/register file 28 assigned to the instruction is stored into the future file 26 storage location corresponding to that register. When the corresponding execution result is provided, the execution result is stored into the corresponding storage location (assuming that a subsequent instruction which updates the register has not been dispatched).

It is noted that, in one embodiment, a group of up to six instructions is selected from instruction queue 20 and moves through the pipeline within lookahead/collapse unit 24 as a unit. If one or more instructions within the group generates a stall condition, the entire group stalls. An exception to this rule is if lookahead/collapse unit 24 generates a split line condition due to the number of ESP updates within the group. Such a group of instructions is referred to as a "line" of instructions herein.

Instruction windows 30 receive instructions from lookahead/collapse unit 24. Instruction windows 30 store the instructions until the operands corresponding to the instructions are received, and then select the instructions for execution. Once the address operands of an instruction including a memory operation have been received, the instruction is transmitted to one of the address generation units 34. Address generation units 34 generate an address from the address operands and forward the address to load/store unit 36. On the other hand, once the execution operands of an instruction have been received, the instruction is transmitted to one of the functional units 32 for execution. In one embodiment, each integer window 30A–30B includes 25 storage locations for instructions. Each integer window 30A–30B is configured to select up to two address generations and two functional unit operations for execution each clock cycle in the address generation units 34 and functional units 32 connected thereto. In one embodiment, instructions fetched from L0 I-cache 16 remain in the order fetched until stored into one of instruction windows 30, at which point the instructions may be executed out of order.

In embodiments of processor 10 employing the x86 instruction set, an instruction may include implicit memory operations for load/store unit 36 as well as explicit functional operations for functional units 32. Instructions having no memory operand do not include any memory operations, and are handled by functional units 32. Instructions having a source memory operand and a register destination operand include an implicit load memory operation handled by load/store unit 36 and an explicit functional operation handled by functional units 32. Instructions having a memory source/destination operand include implicit load and store memory operations handled by load/store unit 36 and an explicit functional operation handled by functional units 32. Finally, instructions which do not have an explicit functional operation are handled by load/store unit 36. Each memory operation results in an address generation handled either by lookahead/collapse unit 24 or address generation units 34. Memory operations and instructions (i.e. functional operations) may be referred to herein separately, but may be sourced from a single instruction.

Address generation units 34 are configured to perform address generation operations, thereby generating addresses for memory operations in load/store unit 36. The generated addresses are forwarded to load/store unit 36 via result buses 48. Functional units 32 are configured to perform integer arithmetic/logical operations and execute branch instructions. Execution results are forwarded to future file 26, reorder buffer/register file 28, and instruction windows 30A–30B via result buses 48. Address generation units 34 and functional units 32 convey the result queue tag assigned to the instruction being executed upon result buses 48 to identify the instruction being executed. In this manner, future file 26, reorder buffer/register file 28, instruction windows 30A–30B, and load/store unit 36 may identify execution results with the corresponding instruction. FPU/multimedia unit 40 is configured to execute floating point and multimedia instructions.

Load/store unit 36 is configured to interface with L1 D-cache 38 to perform memory operations. A memory operation is a transfer of data between processor 10 and an external memory. The memory operation may be an explicit instruction, or may be implicit portion of an instruction which also includes operations to be executed by functional units 32. Load memory operations specify a transfer of data from external memory to processor 10, and store memory operations specify a transfer of data from processor to external memory. If a hit is detected for a memory operation within L1 D-cache 38, the memory operation is completed therein without access to external memory. Load/store unit 36 may receive addresses for memory operations from lookahead/collapse unit 24 (via lookahead address calculation) or from address generation units 34. In one embodiment, load/store unit 36 is configured perform up to three memory operations per clock cycle to L1 D-cache 38. For this embodiment, load/store unit 36 may be configured to buffer up to 30 load/store memory operations which have not yet accessed D-cache 38. The embodiment may further be configured to include a 96 entry miss buffer for buffering load memory operations which miss D-cache 38 and a 32 entry store data buffer. Load/store unit 36 is configured to perform memory dependency checking between load and store memory operations.

L1 D-cache 38 is a high speed cache memory for storing data. Any suitable configuration may be used for L1 D-cache 38, including set associative and direct mapped configurations. In one particular embodiment, L1 D-cache 38 is a 128 KB two way set associative cache employing 64 byte lines. L1 D-cache 38 may be organized as, for example, 32 banks of cache memory per way. Additionally, L1 D-cache 38 may be a linearly addressed/physically tagged cache employing a TLB similar to L1 I-cache 14.

External interface unit 42 is configured to transfer cache lines of instruction bytes and data bytes into processor 10 in response to cache misses. Instruction cache lines are routed to predecode unit 12, and data cache lines are routed to L1 D-cache 38. Additionally, external interface unit 42 is configured to transfer cache lines discarded by L1 D-cache 38 to memory if the discarded cache lines have been modified by processor 10. As shown in FIG. 1, external interface unit 42 is configured to interface to an external L2 cache via L2 interface 44 as well as to interface to a computer system via bus interface 46. In one embodiment, bus interface unit 46 comprises an EV/6 bus interface.

Figure 2:
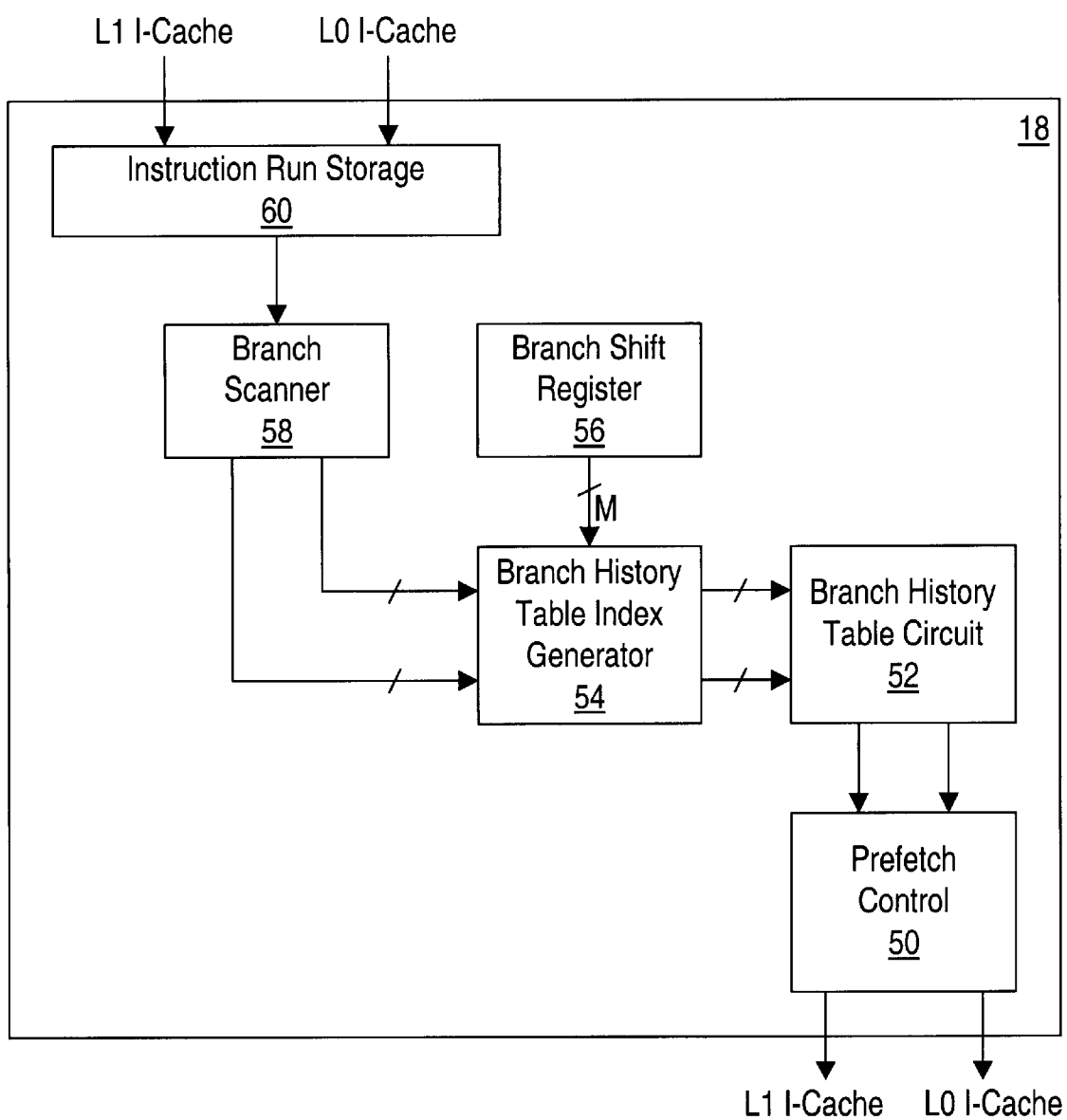
FIG. 2 is a block diagram of one embodiment of a fetch/scan unit shown in FIG. 1.

Turning now to FIG. 2, a block diagram of one embodiment of fetch/scan unit 18 is shown. Other embodiments of fetch/scan unit 18 are possible and contemplated, and the present invention should not be limited to that shown in FIG. 2. Fetch/scan unit 18 includes a prefetch control unit 50, branch history table circuit 52, branch history table index generator 54, branch history storage 56, branch scanner 58, and instruction run storage 60. Instruction run storage 60 is coupled to branch scanner 58 which, in turn, is coupled to branch history table index generator 54. Branch history table index generator 54 is also coupled to branch history storage 56 and branch history table circuit 52. Prefetch control unit 50 is coupled to branch history table circuit 52.

Instruction run storage 60 is configured to receive a run or plurality of instructions from L1 I-cache 14 or L0 I-cache 16. Branch scanner 58 scans the instruction run in storage 60 in parallel with an instruction scanner (not shown in FIG. 2). Branch scanner 58 scans the start bits and control transfer bits of the instruction run to identify two branch instructions (i.e., first and second branch instructions) within the instruction run. As described above, a branch instruction is identified by the control transfer bit corresponding to the start byte of an instruction (as identified by the start bit) being set. The fetch addresses of each branch instruction (determined from the fetch address of the run section including each branch instruction and the position of the branch instruction within this section) are routed to branch history table index generator 54.

Branch history storage device 56 is configured to store a multi-bit branch history value. Often times the branch history storage device is a shift register, and the remaining description of the preferred embodiments may refer to branch history storage device 56 as branch shift register 56. Each bit of the branch history value stored in branch shift register 56 corresponds to the resolution of a previously executed conditional branch instruction. More particularly, each bit of the branch history value indicates whether a previously executed branch instruction was resolved as taken or not taken. The resolutions of previously executed branch instructions can come from functional units 32A–32D (not shown in FIG. 2). The branch history value stored within branch shift registers 56 is updated upon prediction of each branch instruction. The update occurs by shifting into the least significant bit of the stored history value, the appropriate value (i.e., logical 1 or logical 0) corresponding to the taken or not taken prediction (e.g., logical 1 for taken and logical 0 for not taken), while the most significant bit of the branch history value is shifted out and discarded. However, given that branch mispredictions occur, the contents of the branch shift register are stored in a check point register (not shown in FIG. 2) prior to update on prediction and later reloaded into branch shift register 56, and correctly changed, if the initial prediction is deemed incorrect upon resolution.

Branch history table index generator is configured to generate, in one clock cycle, a pair of branch history table indexes based on the combination of the contents of the branch shift register 56 and the branch fetch addresses provided by branch scanner 58. The generated branch history table indexes are provided to branch history table circuit 52.

Branch history table circuit 52 is configured to receive the pair of branch history table indexes from branch history table index generator 54, and in response thereto, outputs a pair of counter values to prefetch control unit 50. Branch history table circuit 52 includes a branch history table, which stores a plurality of bimodal counters. These bimodal counters are typically 2-bit values, the most significant bit of which is used to predict a corresponding branch instruction. More particularly, the more significant bit (e.g., the counter value) of each bimodal counter indicates the taken/not taken prediction (e.g., taken or set, not taken or clear). This table is updated after actual resolution of branch instructions. Each time a branch instruction is actually taken, a corresponding bimodal counter is incremented, and each time a branch instruction is actually resolved as not taken, a corresponding counter is decremented. Each bimodal counter is saturating. In other words, each bimodal counter saturates at a minimum and maximum value (i.e., subsequent decrements of the minimum value and increments of the maximum value cause no change in the counter). The counter values (taken/not taken) are provided to prefetch control unit 50. Prefetch control unit 50 uses counter values to determine to determine the L1 prefetch address or the L0 prefetch address for use by the L1 I-cache 14 and L0 I-cache 16, respectively.

As noted above, branch scanner 58 identifies two branch instructions within instruction run storage 60. The mechanism shown in FIG. 2 is configured to select and provide two counter values to prefetch control unit 50, in one clock cycle, corresponding to the two branch instructions detected by branch scanner 58. The counter values are in essence the predictions for the branch instructions. The counter value selection corresponding to the detected second branch instruction is dependent upon the counter value of the first branch instruction. The branch history table circuit 52 selects the second counter value by reading both of the counter values which might be selected (i.e., the counter values that would be selected if the first branch instruction is predicted not taken) and then chooses one of the two selected counter values based on the counter value selected for the first branch instruction. In this fashion, the second counter value is selected without waiting for the branch shift register to be updated with the first counter value or the prediction of the first instruction.

Figure 3:
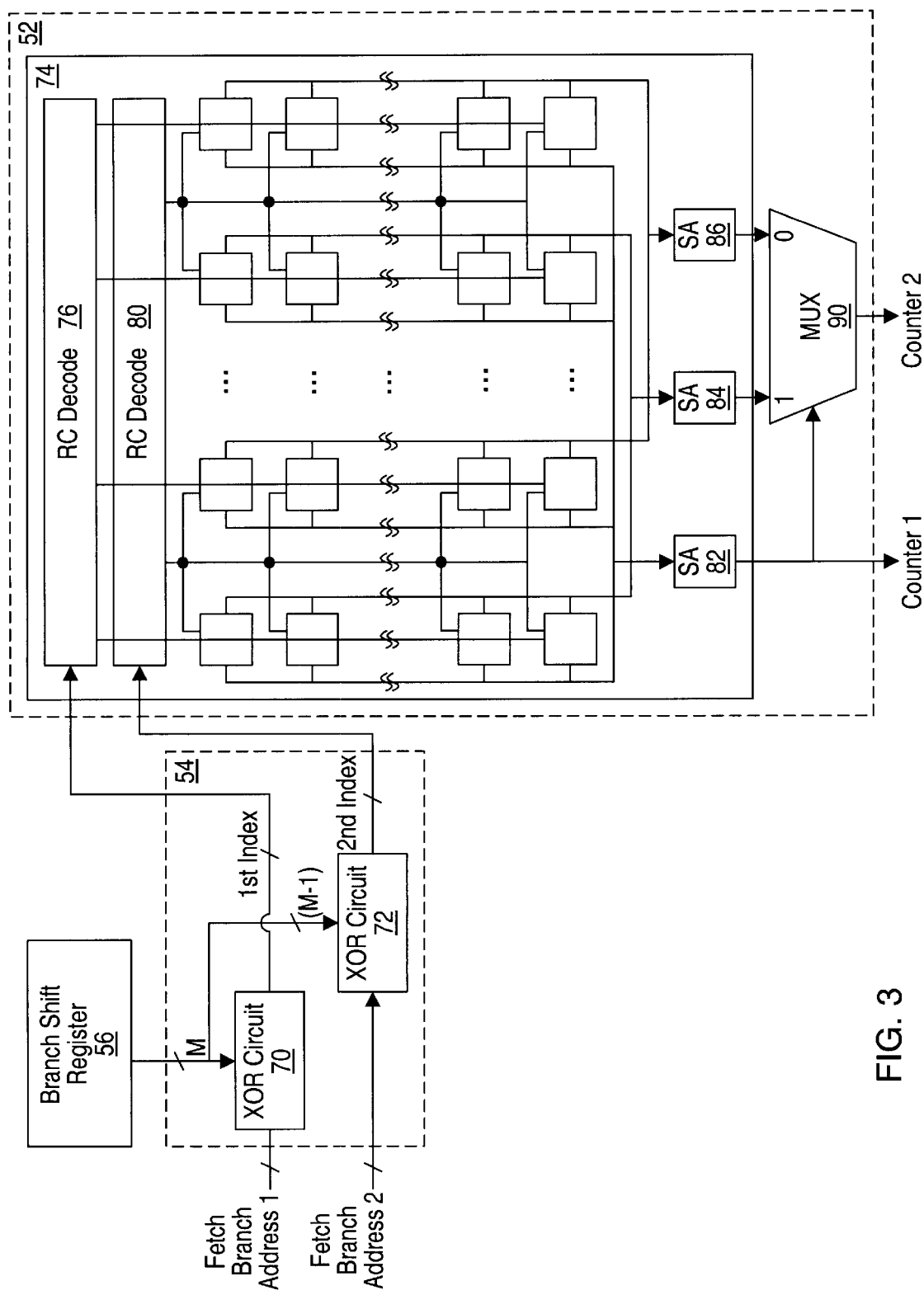
FIG. 3 is a block diagram of one embodiment of a branch history table index generator and branch history table circuit shown in FIG. 2.

FIG. 3 shows one embodiment of the branch history table index generator 54 and branch history table circuit 52 of FIG. 2. Branch history table index generator 54 includes a pair of XOR circuits 70 and 72 coupled to branch shift register 56 and coupled to receive the branch fetch addresses (branch fetch address 1 and branch fetch address 2) provided by branch scanner 58. The first and second branch fetch addresses correspond to the first and second branch instructions detected in instruction run storage 60 by branch scanner 58. XOR circuit 70 is configured to generate the first branch history table index corresponding to the detected first branch instruction. The first branch history table index is generated as a function of the first branch fetch address and the M-bit branch history value stored in branch register 56. In one embodiment, the first branch history table index is generated by XORing the M-bit branch history value with a portion of the first branch fetch address corresponding to the first branch instruction. More particularly in this embodiment, the most significant bit of the branch history value is XORed with the most significant bit within the portion of the first branch fetch address, and so forth through the least significant bit of the branch history value being XORed with the least significant bit within the portion of the first branch fetch address. XOR circuit 72 operates substantially similar to XOR circuit 70 in generating the second branch history table index. However, where XOR circuit 70 uses the full M-bits of the branch history value stored in branch shift register 56 to generate the first branch history table index, XOR circuit 72 uses the least significant (M-1) bits of the branch history value. The least significant bits of the branch history value will be referred to as the second or speculative branch history value. XOR circuit 72 then operates to XOR a portion of the second branch fetch address corresponding to the second detected branch instruction with the speculative M-bit branch history value to generate the second branch history table index. More particularly, the most significant bit of the speculative branch history value is XORed with the most significant bit within the portion of the second branch fetch address, and so forth through the least significant bit of the speculative branch history being XORed with the least significant bit within the portion of the second branch fetch address. Again, it is noted that the first and second branch history table indexes are generated within one clock cycle which is consistent with the general goal of the present invention to access the branch history table twice within one clock cycle.

Branch history table circuit 52 in FIG. 3 comprises a dual port branch history table storage array 74 for storing the plurality of bimodal counters described above. The dual port storage array is configured to allow simultaneous read accesses. The dual port storage array 74 includes a pair or row/column (RC) decoders 76 and 80, and sense amplifiers 82–86. The dual port storage array is configured to simultaneously output (1) the first counter value in response to RC decoder 76 receiving the first branch history table index and (2) a pair of counter values, one of which is subsequently chosen to be the second counter value, in response to RC decoder 80 receiving the second branch history table index. Branch history table circuit 52 also includes a selection circuit 90, which, in one embodiment, comprises a multiplexer.

RC decode 76 asserts the appropriate column and row lines within the storage array so that the first counter value from one storage element corresponding to the first branch history table index, can be read by sense amplifier 82 (FIG. 3 shows only column select and bit lines). In contrast RC decode 80 asserts the appropriate row line and pair of column select lines so that a pair of counter values from adjacent storage elements in one row can be sensed and outputted to multiplexer 90 by sense amplifiers 84 and 86, wherein the adjacent storage elements correspond to the second branch history table index. The second counter value is chosen from pair of counters by multiplexer 90 based upon the first counter value corresponding to the first branch instruction. The first counter value is not known in advance of selecting the pair of counter values. However, it is either taken or not taken. If, for example, the first branch instruction is predicted as taken (i.e., the first counter value is a logical 1), then the second counter value will come from one of the pair of adjacent storage elements activated by RC decoder 80. If the first branch instruction is predicted as not taken (i.e., the first counter value is a logical 0), then the second counter value will come from the other of the pair of adjacent storage elements activated by RC decoder 80.

The outputs of sense amps 84 and 86 are provided to data inputs of multiplexer 90 while the output of sense amp 82 is provided to selection input of multiplexer 90. The first counter value outputted by sense amp 82 is used to select between the two speculative counter values provided to the inputs of multiplexer 90. Accordingly, if the first counter value is a logical one, multiplexer 90 selects for output the counter value provided by sense amplifier 84. In contrast, if the first counter value is a logical zero, multiplexer 90 selects for output therefrom the counter value provided by sense amp 86. Accordingly, it can be seen that multiplexer 90 selects the second counter based upon the value of the first counter.

Figure 4:
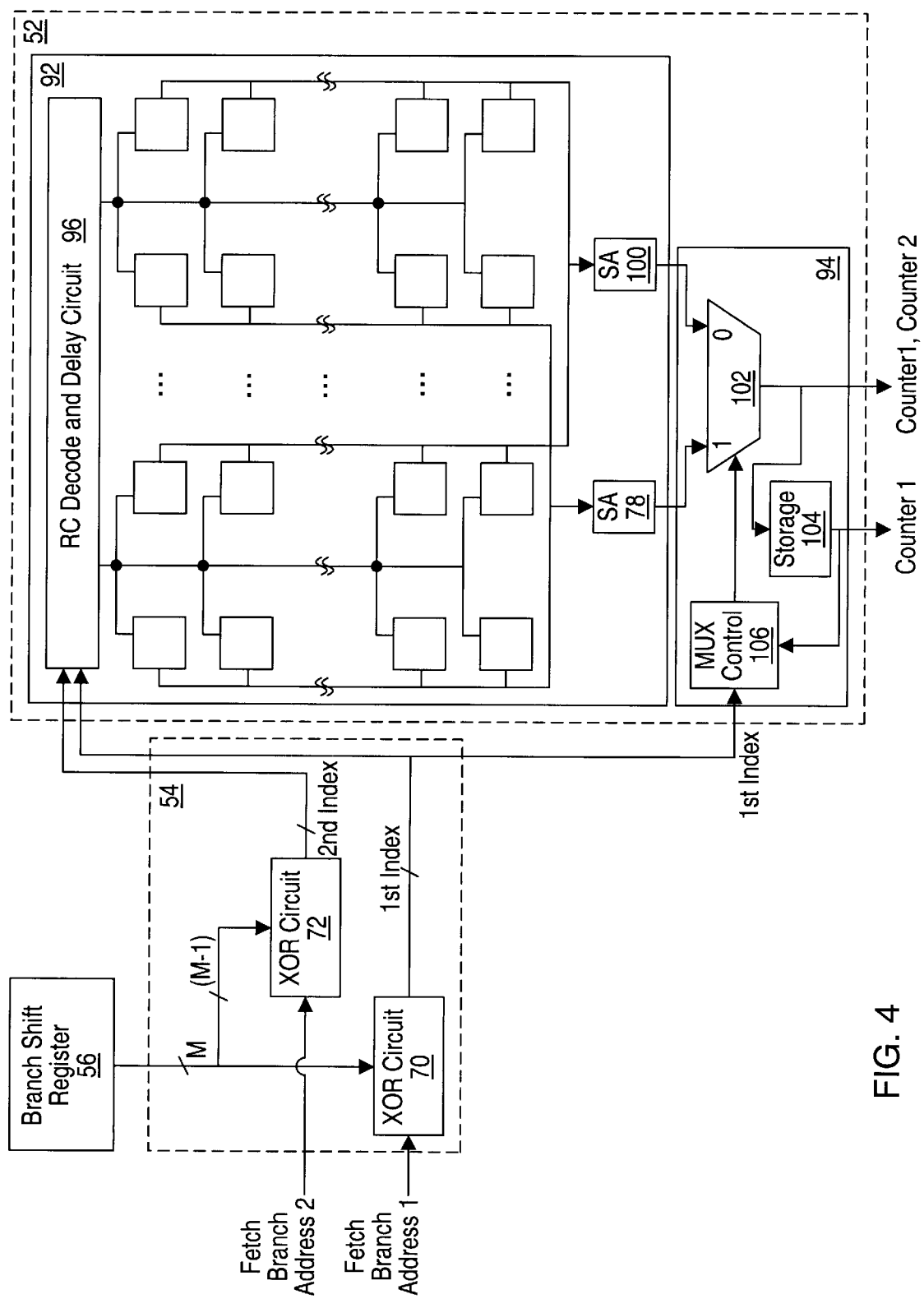
FIG. 4 is a block diagram of illustrating another embodiment of the branch history index generator and branch history table circuit shown in FIG. 2.

FIG. 4 shows an alternative embodiment of the branch history table circuit 52 shown in FIG. 2. More particularly, FIG. 4 shows a single ported branch history table storage array 92 coupled to selection circuit 94. Single ported storage array 92 in FIG. 4 includes a decoder with selected delay circuit 96 coupled to receive the first and second branch history table indexes. Selected delay circuit 96 ignores the least significant bit of the first branch history table index. In response to receiving either the first or second branch history table indexes, decode with selected delay circuit 96 asserts the appropriate row select line and pairs of column select lines within the storage array to enable sense amplifiers 98 and 100 to sense a pair of counter values stored in adjacent storage elements (FIG. 4 shows only column select and bit lines).

Selection circuit 94 comprises, in one embodiment, multiplexer 102 having a pair of data inputs configured to receive the outputs of sense amplifiers 96 and 100, an output coupled to storage unit 104, and a selection input coupled to mux control 106. Mux control unit 106 is configured to receive and pass either the least significant bit of the first branch history table index or the contents of storage unit 104.

Decode with selected delay circuit 96 operates to double pump the storage array to enable sequential read access thereof within a single clock cycle. In operation, decode with select delay circuit 96 simultaneously receives the first and second branch history table indexes. Decode with selective delay circuit 96 immediately asserts the appropriate row select and pair of column select lines within the storage array corresponding to the (M-1) most significant bits of the first branch history table index. Sense amplifiers 96 and 100 sense the values stored within the adjacent storage elements of the asserted row and the asserted pair of columns. The output of the sense amplifiers 96 and 100 are provided to multiplexer 102. Mux control unit 106 simultaneously receives the least significant bit of the first branch history table index. Mux control 106 passes the least significant bit to the selection input of multiplexer 102. In response, multiplexer 102 selects one of the two counter values provided by sense amplifier 96 or sense amplifier 100 based on the value of the least significant bit of the first branch history table index. The selected counter value is stored within storage unit 104 as the first counter value. After a slight delay, decode with selected delay circuit 96 asserts the appropriate row select line and pair of column select lines associated with the second branch history table index. Sense amplifiers 96 and 100, in turn, sense a pair of counter values stored in adjacent storage elements from the selected row and pair of columns. The pair of counter values are provided to multiplexer 102. Mux control 106 then passes the first counter value stored within storage unit 104 to selection input of multiplexer 102. In response, multiplexer 102 selects one of the pair of counter values provided by sense amplifier 96 or sense amplifier 100 for output as the second counter value.

The embodiments shown within FIGS. 3 and 4 illustrate accessing branch history table circuit 52 with branch history table indexes generated as a function of the branch history value and branch fetch addresses. However, it is to be understood that the present application has application to accessing branch history table circuit 52 with branch history table indexes which are generated solely as a function of the branch history value.

Figure 5:
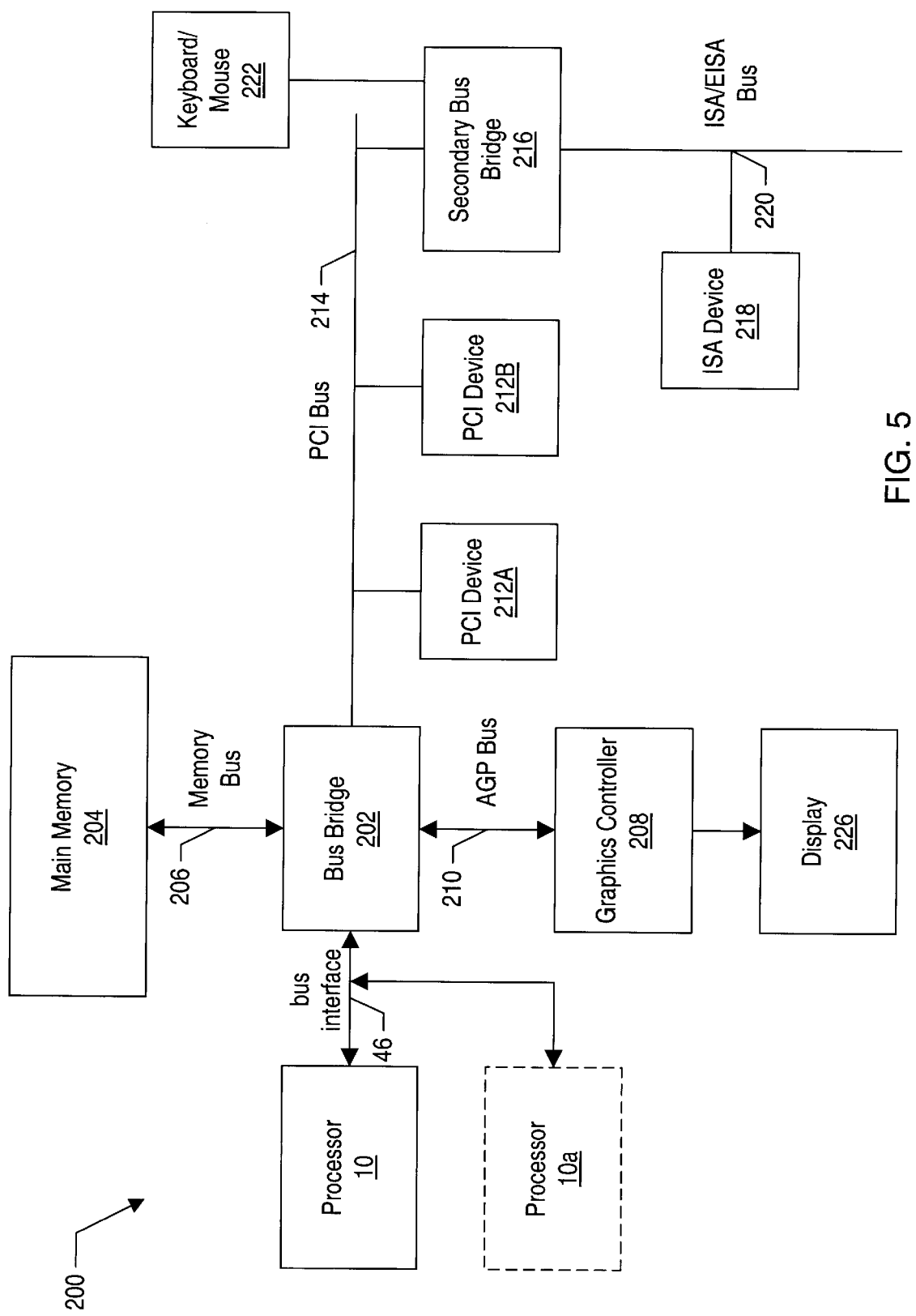
FIG. 5 is a block diagram of the computer system including the processor shown in FIG. 1.

Turning now to FIG. 5, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor is coupled to bus bridge 202 through bus interface 46.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. For example, in one embodiment, secondary bus bridge 216 includes a master PCI arbiter (not shown) for arbitrating ownership of PCI bus 214. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to bus interface 46 between processor 10 and bus bridge 202 in other embodiments. Alternatively, the external cache may be coupled to bus bridge 202 and cache control logic for the external cache may be integrated into bus bridge 202.

Main memory 204 is a memory in which application programs are stored and from which processor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may share bus interface 46 with processor 10 (as shown in FIG. 13) or may be connected to bus bridge 202 via an independent bus.

Numerous variations and modifications will become apparent to those skilled in the art once the above disclosure is fully appreciated. It is intended that the following claims be interpreted to embrace all such variations and modifications.

What is claimed is:

1. A method of operating a microprocessor, the method comprising:

generating a first branch history table index;

accessing a branch history table using the first branch table history index;

reading a first counter value from the branch history table in response to accessing the branch history table using the first branch history table index;

generating a second branch history table index;

accessing the branch history table using the second branch history table index;

reading a pair of counter values from the branch history table in response to accessing the branch history table using the second branch history table index.

2. The method of claim 1 wherein the first branch history table index is generated as a function of a first branch history value and at least a portion of a fetch address of a first branch instruction.

3. The method of claim 2 where the first branch history table index is generated by XORing the first branch history value and the at least the portion of the fetch address of the first branch instruction.

4. The method of claim 1 wherein the second branch history table index is generated as a function of a second branch history value and at least a portion of a fetch address of a second branch instruction.

5. The method of claim 4 where the second branch history table index is generated by XORing the second branch history value and the at least the portion of the fetch address of the second branch instruction.

6. The method of claim 1 wherein the first branch history table index is generated as a function of a first M-bit branch history value and the second branch history table index is generated as a function the (M-1) least significant bits of the first branch history value.

7. The method of claim 1 wherein the first counter value and the pair of counter values are read from the branch history table during one clock cycle.

8. The method of claim 1 further comprising selecting the one of the pair of counter values based on a value of the first counter value.

9. The method claim 1 wherein the first and second branch table indexes are generated prior to accessing the branch history table with the first branch table index.

10. A method of operating a microprocessor, the method comprising:

generating a first branch history table index;

accessing a branch history table using a first branch history table index;

reading a first pair of counter values from the branch history table in response to accessing the branch history table using the first branch history table index;

generating a second branch history table index;

accessing the branch history table using the second branch history table index;

reading a second pair of counter values from the branch history table in response to accessing the branch history table using the second branch history table index.

11. The method of claim 10 wherein the first branch history table index is generated as a function of a M-bit branch history value, and wherein the second branch history table index value is generated as a function of the (M-1) least significant bits of the M-bit branch history value.

12. The method of claim 10 wherein the first and second pairs of counter values are read from the branch history table during one clock cycle.

13. The method of claim 10 further comprising selecting one of the first pair of counter values based on the least significant bit of the first branch history table index.

14. The method of claim 13 further comprising selecting one of the second pair of counter values based on the selected one of the first pair of counter values.

15. The method of claim 10 wherein the first and second branch history table indexes are generated as a function of first and second branch instruction fetch addresses, respectively.

16. The method of claim 10 wherein the first and second branch history table indexes are generated prior to accessing the branch history table using the first branch history table index.

17. A processor comprising:
a branch history storage device configured to store a M-bit branch history value;
a branch history table circuit configured to store a plurality of counter values;
a branch history index generator coupled between the branch history table circuit and the branch history storage device, wherein the branch history index generator is configured to generate first and second branch history table indexes, wherein the branch history table circuit is configured to receive the first and second branch history table indexes, wherein the branch history table circuit is configured to output a first counter value in response to the branch history table circuit receiving the first branch history table index, wherein the branch history table circuit is configured to output a pair of counter values in response to the branch history table circuit receiving the second branch history table index;
a selection circuit coupled to the branch history table circuit, wherein the selection circuit is configured to receive the pair of counter values outputted from the branch history table circuit, and wherein the selection circuit is configured to select for output therefrom one of the pair of counter values outputted from the branch history table circuit.

18. The processor of claim 17 wherein the selection circuit is configured to receive the first counter value, wherein the selection circuit is configured to select one of the pair of counter values based on the first counter value.

19. The processor of claim 17 wherein the selection circuit includes a multiplexer having a pair of data inputs coupled to receive the pair of counter values outputted from the branch history table and a selection input coupled to receive the first counter value, wherein the multiplexer selects for output one of the pair of counter values in response to the selection input receiving the first counter value.

20. The processor of claim 17 wherein the branch history table circuit includes a dual ported storage device for storing the plurality of counter values, wherein the dual ported storage device is configured to concurrently receive the first and second branch history table indexes, and wherein the dual ported storage device is configured to concurrently output the first counter value and the pair of counter values in response to the dual ported storage device concurrently receiving the first and second branch history table indexes.

21. The processor of claim 17 wherein the branch history index generator is configured to generate the first branch history index as a function of the M-bit branch history value stored in the branch history storage device.

22. The processor of claim 21 wherein the branch history index generator is configured to generate the first branch history index as a function of the M-bit branch history value stored in the branch history storage device and at least a portion of a fetch address of a first branch instruction.

23. The processor of claim 22 wherein the branch history index generator is configured to generate the first branch history index by XORing the M-bit branch history value with the at least the portion of the fetch address of the first branch instruction.

24. The processor of claim 23 wherein the branch history index generator is configured to generate the second branch history table index from the (M-1) least significant bits of the M-bit branch history value stored in the branch history storage device.

25. The processor of claim 24 wherein the branch history index generator is configured to generate the second branch history table index as a function of the (M-1) least significant bits of the M-bit branch history value and the least a portion of a fetch address of a second branch instruction.

26. The processor of claim 25 wherein the branch history index generator is configured to generate the second branch history table index by XORing the (M-1) least significant bits of the M-bit branch history value with the at least the portion of the fetch address of the second branch instruction.

27. The processor of claim 17 wherein the branch history index generator is configured to generate the second branch history table index from the (M-1) least significant bits of the M-bit branch history value stored in the branch history storage device.

28. The microprocessor of claim 17 wherein the branch history index generator is configured to generate the first and second branch history table indexes during one clock cycle.

29. The microprocessor of claim 17 wherein the branch history table circuit is configured to output the first counter value and the pair of counter values during one clock cycle.

30. The microprocessor claim 29 wherein the branch history index generator is configured to generate the first and second branch history table indexes during the one clock cycle.

31. A processor comprising:
a branch history storage device configured to store a M-bit branch history value;
a branch history table circuit configured to store a plurality of counter values;
a branch history index generator coupled between the branch history table circuit and the branch history storage device, wherein the branch history index generator is configured to generate first and second branch history table indexes, wherein the branch history table circuit is configured to receive the first and second branch history table indexes, wherein the branch history table circuit is configured to output a first pair of counter values in response to the branch history table circuit receiving the first branch history table index, wherein the branch history table circuit is configured to output a second pair of counter values in response to the branch history table circuit receiving the second branch history table index;
a selection circuit coupled to the branch history table circuit, wherein the selection circuit is configured to receive the first and second pairs of counter values outputted from the branch history table circuit, and wherein the selection circuit is configured to select for output therefrom one of the first pair of counter values and one of the second pair of counter values.

32. The microprocessor of claim 31 wherein the selection circuit is configured to select the one of the pair of second counter values based on the selected one of the first pair of counter values.

33. The processor of claim 32 wherein the selection circuit comprises a multiplexer having a pair of data inputs for sequentially receiving the first and second pairs of counter values from the branch history table circuit.

34. The processor of claim 31 wherein the branch history table circuit includes a single ported storage device for storing the plurality of counter values, wherein the single ported storage device is configured to sequentially receive the first and second branch history table indexes, and wherein the single ported storage device is configured to sequentially output the first and second pairs of counter values in response to the single ported storage device sequentially receiving the first and second branch history table indexes.

35. The processor of claim 31 wherein the branch history index generator is configured to generate the first branch history index as a function of the M-bit branch history value stored in the branch history storage device.

36. The processor of claim 31 wherein the branch history index generator is configured to generate the first branch history index as a function of the M-bit branch history value stored in the branch history storage device and at least a portion of a fetch address of a first branch instruction.

37. The processor of claim 36 wherein the branch history index generator is configured to generate the first branch history index by XORing the M-bit branch history value with the at least the portion of the fetch address of the first branch instruction.

38. The processor of claim 37 wherein the branch history index generator is configured to generate the second branch history table index as a function of the (M-1) least significant bits of the M-bit branch history value.

39. The processor of claim 38 wherein the branch history index generator is configured to generate the second branch history table index as a function of the (M-1) least significant bits of the M-bit branch history value and the least a portion of a fetch address of a second branch instruction.

40. The processor of claim 39 wherein the branch history index generator is configured to generate the second branch history table index by XORing the (M-1) least significant bits of the M-bit branch history value with the at least the portion of the fetch address of the second branch instruction.

41. The processor of claim 31 wherein the branch history index generator is configured to generate the second branch history table index as a function of the (M-1) least significant bits of the M-bit branch history value.

42. The microprocessor of claim 31 wherein the branch history index generator is configured to generate the first and second branch history table indexes during one clock cycle.

43. The microprocessor of claim 31 wherein the branch history table circuit is configured to output the first and second pairs of counter values during one clock cycle.

44. The microprocessor claim 43 wherein the branch history index generator is configured to generate the first and second branch history table indexes during the one clock cycle.

45. A computer system comprising:
a processor, the processor comprising;
a branch history storage device configured to store a M-bit branch history value;
a branch history table circuit configured to store a plurality of counter values;
a branch history index generator coupled between the branch history table circuit and the branch history storage device, wherein the branch history index generator is configured to generate first and second branch history table indexes, wherein the branch history table circuit is configured to receive the first and second branch history table indexes, wherein the branch history table circuit is configured to output a first counter value in response to the branch history table circuit receiving the first branch history table index, wherein the branch history table circuit is configured to output a pair of counter values in response to the branch history table circuit receiving the second branch history table index;
a selection circuit coupled to the branch history table circuit, wherein the selection circuit is configured to receive the pair of counter values outputted from the branch history table circuit, and wherein the selection circuit is configured to select for output therefrom one of the pair of counter values outputted from the branch history table circuit;
an input/output device coupled to said processor, wherein the input/output device is configured to communicate between said computer system and another computer system to which said input/output device is coupled.

46. The computer system of claim 45 further comprising a second processor.

47. A computer system comprising:
a processor, the processor comprising;
a branch history storage device configured to store a M-bit branch history value;
a branch history table circuit configured to store a plurality of counter values;
a branch history index generator coupled between the branch history table circuit and the branch history storage device, wherein the branch history index generator is configured to generate first and second branch history table indexes, wherein the branch history table circuit is configured to receive the first and second branch history table indexes, wherein the branch history table circuit is configured to output a first pair of counter values in response to the branch history table circuit receiving the first branch history table index, wherein the branch history table circuit is configured to output a second pair of counter values in response to the branch history table circuit receiving the second branch history table index;
a selection circuit coupled to the branch history table circuit, wherein the selection circuit is configured to receive the first and second pairs of counter values outputted from the branch history table circuit, and wherein the selection circuit is configured to select for output therefrom one of the first pair of counter values and one of the second pair or counter values;
an input/output device coupled to said processor, wherein the input/output device is configured to communicate between said computer system and another computer system to which said input/output device is coupled.

48. The computer system of claim 47 further comprising a second processor.

* * * * *